United States Patent [19]

East

[11] Patent Number: 4,551,940
[45] Date of Patent: Nov. 12, 1985

[54] FISHING LURE

[75] Inventor: David S. East, Garland, Tex.

[73] Assignee: Knight Manúfacturing Company, Inc., Tyler, Tex.

[21] Appl. No.: 605,128

[22] Filed: Apr. 30, 1984

[51] Int. Cl.$^4$ .......................................... A01K 85/00
[52] U.S. Cl. ................... 43/42.11; 43/42.13; 43/42.19
[58] Field of Search ............... 43/42.11, 42.13, 42.19, 43/42.24, 34, 35

[56] References Cited

U.S. PATENT DOCUMENTS

| 163,980 | 6/1975 | Dunlap | 43/34 |
| 3,483,650 | 12/1969 | Weaver | 43/35 |
| 3,546,804 | 12/1970 | Woolums | 43/42.11 |
| 4,011,681 | 3/1977 | Johnson | 43/42.11 |

FOREIGN PATENT DOCUMENTS 656 of 1891 United Kingdom ................... 43/34

*Primary Examiner*—Gene P. Crosby
*Attorney, Agent, or Firm*—Jerry W. Mills; Gregory M. Howison

[57] ABSTRACT

A spinner bait includes a pair of fishhooks secured together in a generally V-shaped configuration and at an angle of approximately 45 degrees. Each of the fishhooks is of conventional design and comprises a barbed hook and a wire lead integrally connected thereto and terminating in a connecting eye. A lead sinker is positioned on the wire lead of the first fishhook proximate the barbed hook. A spinner blade is rotatably secured to the barbed hook of the second fishhook. In an alternative embodiment, a flexible skirt of plastic or rubber streamers is additionally provided on the wire lead of the first fishhook proximate the barbed hook and is configured so as to partially conceal the hook. Once coupled together, the fishhooks are constrained to move in concert and are not free swinging and are arranged so that the arcuate portions of their respective barbed hooks face each other. In another alternative embodiment, the two fishhooks are integrally formed from a single piece of wire.

12 Claims, 4 Drawing Figures

FISHING LURE

TECHNICAL FIELD

This invention relates to fishing lures generally and more specifically to fishing lures of the spinner design, commonly referred to as "spinner baits".

BACKGROUND OF THE INVENTION

In recent years sport fishing has become one of the most popular of all outdoor sports. With this increased popularity has come the development of various baits and lures. Perhaps the most effective of all lures is the spinner bait which is widely used in sport fishing and is favored by many experienced fishermen.

Conventional spinner lures include a single fishhook and at least one spinner element or blade disposed on a side of the lure opposite the fishhook and adapted to rotate about a shaft as the lure is drawn through water. The spinner element typically has a bright metallic finish so that it emits periodic flashes of light in the water as it rotates to thus attract the attention of fish. Previous lures have, however, suffered from several limitations. The most significant of those limitations has been the ineffectiveness of some prior spinner baits in snaring fish and in subsequently retaining the fish once a fish has been snared. That problem is particularly prevalent in the traditional design where the single fishhook is disposed at a distance from the spinner blade, as in many instances, the fish will be attracted to and strike the spinner blade and elude the hook altogether. With some prior lures, even after a fish is snared by the fishhook, the fish can easily shake free of the hook as the lure is retrieved through water.

The effectiveness of previous lures has also tended to be adversely affected by weight imbalances. Because the weight of previous spinner lures has typically been concentrated on the hook side of the lure, those lures have tended to sink unevenly and have often tended not to run level as the lure is drawn through water.

The fishing lure of the present invention obviates many of the disadvantages associated with previous spinner baits by providing an improved spinner bait which includes a pair of fishhooks disposed on opposite sides of the lure to enhance the effectiveness of the lure in snaring and retrieving fish. The lure is well-balanced and will thus decline evenly when the fishing line is cast or allowed to freefall into water and will run level as the lure is drawn through water.

SUMMARY OF THE INVENTION

The present invention described and disclosed herein comprises an improved spinner bait which is easily controlled in both surface and sub-surface use and which is effective in snaring and in retaining fish as the bait is retrieved through water.

More specifically, the spinner bait of the present invention includes a pair of fishhooks secured together in a generally V-shaped configuration and at an angle of approximately 45 degrees. Each of the fishhooks is of conventional design and comprises a barbed hook and a wire lead integrally connected thereto and terminating in a connecting eye. A lead sinker is positioned on the wire lead of the first fishhook proximate the barbed hook. A spinner blade is rotatably secured to the barbed hook of the second fishhook. In an alternative embodiment, a flexible skirt of plastic or rubber streamers is additionally provided on the wire lead of the first fishhook proximate the barbed hook and is configured so as to partially conceal the hook. Once coupled together, the fishhooks are constrained to move in concert and are not free swinging and are arranged so that the arcuate portions of their respective barbed hooks face each other.

The present spinner bait is well balanced as the weight of the lure is approximately evenly distributed to either side. The bait will thus descend evenly along an inclined path when the fishing line is cast or allowed to freefall into the water and will run level as the lure is drawn through water. The two fishhook arrangement enhances the effectiveness of the lure in snaring fish and makes it virtually impossible for a fish to shake free once the fish is snared by one of the hooks. Because the fishhooks move together, when a fish strikes the lure and is snared by one of the hooks, that hook will set in the fish when the fisherman thereafter pulls back on the lure and the second hook, because it pulls in the same direction and at the same time, will also set in the fish. By way of contrast, in a typical crankbait using two treble hooks which moves independently of each other, when one sets in a fish, the other will not necessarily also set as it can swing free and out of the way.

In an alternative embodiment the spinner bait is configured as described above with the two fishhooks being integrally formed from a single piece of wire.

BRIEF DESCRIPTION OF THE DRAWINGS

A more complete understanding of this invention can be had by reference to the following detailed description taken in conjunction with the accompanying Drawing in which.

DETAILED DESCRIPTION OF THE INVENTION

Figure 1:
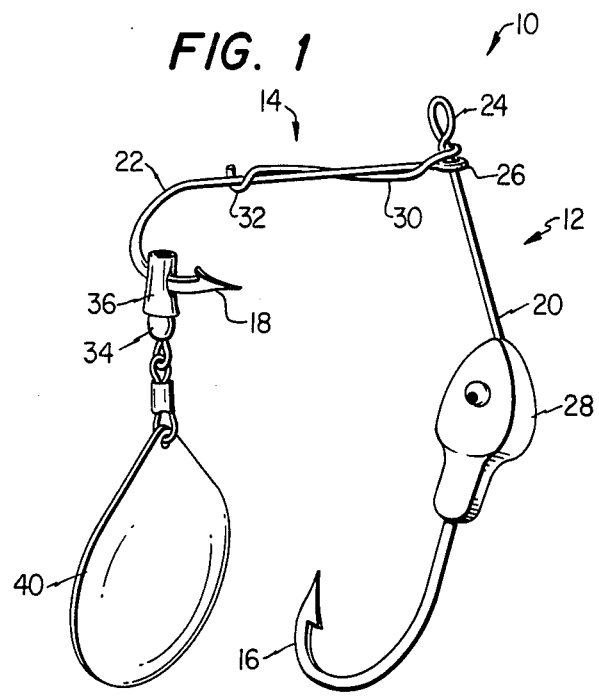
FIG. 1 is a perspective view of the fishing lure of the present invention.

Referring now to the drawing, FIG. 1 shows a perspective representation of the spinner bait of the present invention. The spinner bait 10 includes a first fishhook 12 and a second, substantially identical fishhook 14 secured thereto in a generally V-shaped configuration. Fishhooks 12 and 14 are of conventional design and comprise barbed hooks 16 and 18 having wire leads 20 and 22 integrally connected thereto and terminating in connecting eyes 24 and 26. Fishhook 12 further comprises a sinker 28 of heavier than water construction, suitably lead, which is carried on wire lead 20 and positioned adjacent barbed hook 16. Leads 20 and 22 are suitably of stainless steel wire with eyes 24 and 26 being generally forming by bending and twisting wire leads 20 and 22 upon themselves. In use, eye 24 receives the fishing line (not shown). Though spinner bait 10 is illustrated in FIG. 1 in a substantially vertical position, it should be understood that when the bait is cast in water, the lure will decline evenly and will thereafter run level in a substantially horizontal configuration as it is towed through water. The weight of sinker 28 will maintain fishhook 12 below fishhook 14 so that the arcuate portion of barbed hook 16 is directed upward toward the surface of the water and faces the arcuate portion of barbed hook 18.

Figure 4:
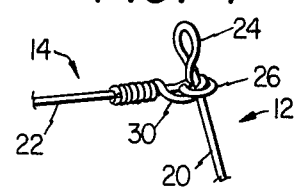
FIG. 4 is a perspective view of the fishing lure similar to FIG. 1, but illustrating an alternative method of coupling the two fishhooks.

Fishhook 14 is secured to fishhook 12 proximate eye 24 by passing an extended portion 30 of wire lead 20 through eye 26 of fishhook 14 to a point 32 along the length of fishhook 14. Portion 30 is then wrapped about lead 22 at point 32 to thus secure fishhook 14 to fishhook 12. In an alternative embodiment shown in FIG. 4, fishhook 14 is secured to fishhook 12 by passing portion 30 through eye 26 and then winding portion 30 about lead 22. When coupled to fishhook 12, fishhook 14 is disposed relative to fishhook 12 at an angle of approximately 45° and is arranged so that barbed hook 18 is substantially parallel to barbed hook 16 with its arcuate portion disposed so as to face the arcuate portion of barbed hook 16. Fishhooks 12 and 14 are constrained when coupled to move in concert and are not at liberty to swing freely and independently of each other.

Fishhook 14 further comprises a swivel member 34 attached thereto proximate the arcuate portion of hook 18 by means of surgical tubing 36. A spinner blade 40 is attached to swivel member 34. Swivel member 34 permits spinner blade 40 to rotate as the lure is drawn through water to thus provide an attractive moving target. Spinner blade 40 is preferably given a bright metallic finish to enhance its reflective qualities and thus its effectiveness in luring fish.

Figure 2:
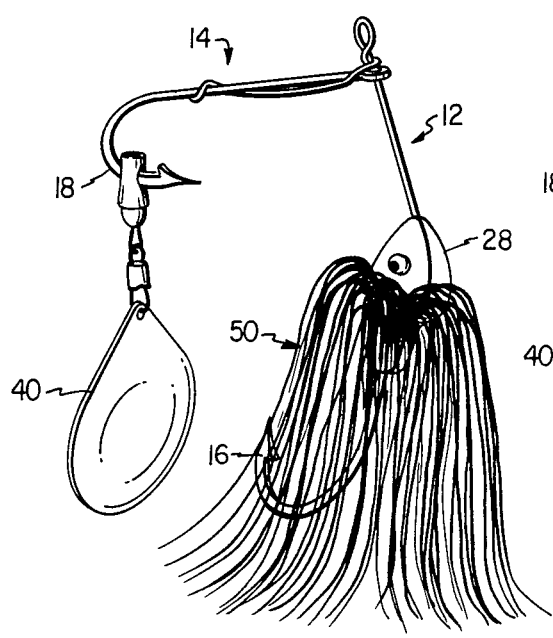
FIG. 2 is a perspective view of an alternative embodiment of the lure which includes a flexible skirt.

In an alternative embodiment shown in FIG. 2, a flexible skirt 50, suitably of plastic or rubber streamers, is attached to wire lead 20 in close proximity to barbed hook 16 and is configured in such a manner that it partially conceals barbed hook 16. Flexible skirt 50 is designed to make the lure appear more life-like and to aid in attracting the attention of fish.

Figure 3:
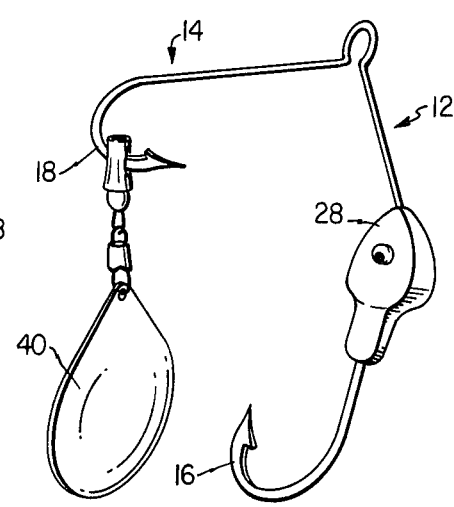
FIG. 3 is a perspective view of an alternative embodiment of the lure.

In another alternative shown in FIG. 3, the spinner bait is configured exactly as shown in FIG. 1, but is integrally formed from a single piece of wire as contrasted with the multi-component fishhook assembly of FIG. 1.

The present spinner bait is constructed so that its weight is approximately evenly distributed to either side of the lure and as a result is well balanced. Thus in operation, when the spinner bait is cast over the water or allowed to freefall, it descends evenly along an inclined path and will run level as the lure is drawn though water. The present spinner bait with its two fishhook design is also more effective than prior spinner baits in snaring fish and in retaining the snared fish on the bait as the bait is retrieved through water. That the spinner blade is itself secured to a fishhook, as contrasted to the traditional spinner bait where the blade is suspended from a straight wire lead, ensures that in those instances where the fish strikes the blade only, the fish will be snared by the hook proximate the blade and will not elude the hook as is often the case with the traditional design.

That the two fishhooks move together further enhances the effectiveness of the spinner bait in snaring fish. Thus if a fish strikes the lure and is snared by one of the hooks, when the fisherman thereafter pulls back on the lure, that hook will set in the fish and because the other hook will be pulled in the same direction and at the same time, it will also set in the fish. This is in contrast to a conventional crankbait having two treble hooks which swing independently of each other. When a fisherman pulls back on the lure in that situation, one hook will set in the fish, but the other hook will not necessarily also set as it can swing free and out of the way.

In summary, a fishing lure has been disclosed which can be effectively used and easily controlled in both surface and sub-surface use. The lure is well balanced and will thus decline evenly and run level as the bait is drawn through water. The bait comprises a pair of fishing hooks arranged at an angle of 45° with the hooks facing each other. Because the fishhooks are constrained to move together and are not free swinging, the effectiveness of the lure in snaring fish is enhanced.

Although the preferred embodiment has been described in detail, it should be understood that various changes, substitutions and alterations can be made therein without departing from the spirit and scope of the invention as defined in the appended claims.

What is claimed is:

1. A fishing lure comprising:
   a first fishhook member having a barbed hook, a wire lead integrally connected to said barbed hook and extending therefrom, and an aperture formed at the terminal end of said wire lead for attachment to a fishing line;
   a second fishhook member having a barbed hook and being secured to said first fishhook member proximate said aperture and disposed relative to said first fishhook member at a predetermined angle, said second fishhook member being further disposed relative to said first fishhook member so that said barbed hook of said second fishhook member faces said barbed hook of said first fishhook member;
   a sinker positioned on said wire lead of said first fishhook member such that said first fishhook member is maintained below said second fishhook member during towing through the water while fishing;
   a swivel member positioned on said barbed hook of said second fishhook member; and
   a spinner blade secured to said swivel member and adapted to rotate as the lure is drawn through water.

2. The fishing lure of claim 1 wherein said second fishhook member is disposed relative to said first fishhook member at an angle of 45 degrees.

3. The fishing lure of claim 1 wherein said first fishhook member and said second fishhook member are integrally formed from a single piece of wire.

4. The fishing lure of claim 1 further comprising a flexible skirt positioned on the wire lead of said first fishhook member proximate said barbed hook and configured so as to partially conceal said barbed hook.

5. The fishing lure of claim 4 wherein said flexible skirt comprises strands of plastic.

6. A fishing lure comprising:
   a first fishhook member having a barbed hook, a wire lead integrally connected to said barbed hook and extending therefrom, and an aperture formed at the terminal end of said wire lead for attachment to a fishing line;
   a second fishhook member having a barbed hook and being secured to said first fishhook member proximate said aperture and disposed relative to said first fishhook member at a predetermined angle, said second fishhook member being further disposed relative to said first fishhook member so that said barbed hook of said second fishhook member faces said barbed hook of said first fishhook member; and
   a sinker positioned on said wire lead of said first fishhook member such that said first fishhook member is maintained below said second fishhook member during towing through the water while fishing;

said second fishhook member having a wire lead with an aperture formed at the terminal end thereof, said second fishhook member being secured to said first fishhook member by first extending a potion of the wire lead of said first fishhook member through the aperture of said second fishhook member and winding said portion around the wire lead of said second fishhook member.

7. A fishing lure comprising:

a first fishhook member having a barbed hook, a wire lead integrally connected to said barbed hook and extending therefrom, and an aperture formed at the terminal end of said wire lead for attachment to a fishing line;

a second fishhook member having a barbed hook and being secured to said first fishhook member proximate said aperture and disposed relative to said first fishhook member at a predetermined angle, said second fishhook member being further disposed relative to said first fishhook member so that said barbed hook of said second fishhook member faces said barbed hook of said first fishhook member; and a sinker positioned on said wire lead of said first fishhook member such that said first fishhook member is maintained below said second fishhook member during towing through the water while fishing;

said second fishhook member having a wire lead with an aperture formed at the terminal end thereof, said second fishhook member being secured to said first fishhook member by first extending a portion of the wire lead of said first fishhook member through the aperture of said second fishhook member to a selected location along the length thereof and then wrapping said portion around the wire lead of said second fishhook member at said location.

8. A fishing lure comprising:

a wire body having a first arm, said first arm having a barbed hook integrally connected thereto at a first end thereof and an aperture formed at the other end thereof for attachment to a fishing line;

said wire body further comprising a second arm having a barbed hook and being secured to said first arm proximate said aperture and disposed relative to said first arm at a predetermined angle, said second arm being further disposed relative to said first arm so that said barbed hook of said second arm faces said barbed hook of said first arm;

a sinker positioned on said first arm proximate said barbed hook such that said first fishhook member is maintained below said second fishhook member during towing through water while fishing;

a swivel member positioned on said barbed hook of said second arm; and a spinner blade secured to said swivel member and adapted to rotate as the lure is drawn through water.

9. The fishing lure of claim 8 wherein said second arm is disposed relative to said first arm at an angle of 45 degrees.

10. The fishing lure of claim 8 wherein said first arm and said second arm are integrally formed from a single piece of wire.

11. The fishing lure of claim 8 further comprising a flexible skirt positioned on said first arm proximate said barbed hook and configured so as to partially conceal said barbed hook.

12. The fishing lure of claim 11 wherein said flexible skirt comprises strands of plastic.

* * * * *